United States Patent
Thornton

(10) Patent No.: US 7,052,290 B1
(45) Date of Patent: May 30, 2006

(54) LOW PROFILE CONNECTOR FOR ELECTRONIC INTERFACE MODULES

(75) Inventor: Curtis W. Thornton, Raleigh, NC (US)

(73) Assignee: Sony Ericsson Mobile Communications AB (SE)

( * ) Notice: Subject to any disclaimer, the term of this patent is extended or adjusted under 35 U.S.C. 154(b) by 0 days.

(21) Appl. No.: 11/161,627

(22) Filed: Aug. 10, 2005

(51) Int. Cl.
*H01R 4/58* (2006.01)

(52) U.S. Cl. .......................................................... 439/91
(58) Field of Classification Search ................. 439/91, 439/71, 86
See application file for complete search history.

(56) References Cited

U.S. PATENT DOCUMENTS

| | | | |
|---|---|---|---|
| 5,738,530 A * | 4/1998 | Schreiber et al. ............. | 439/66 |
| 5,893,765 A * | 4/1999 | Farnworth .................... | 439/91 |
| 5,977,489 A * | 11/1999 | Crotzer et al. ............... | 174/257 |
| 6,064,217 A * | 5/2000 | Smith .......................... | 324/760 |
| 6,264,476 B1 * | 7/2001 | Li et al. ....................... | 439/66 |
| 6,271,482 B1 * | 8/2001 | Crotzer et al. ............... | 174/262 |
| 6,332,786 B1 * | 12/2001 | Suga et al. ................... | 439/91 |
| 6,348,659 B1 * | 2/2002 | Crotzer et al. ............. | 174/68.1 |
| 6,400,965 B1 | 6/2002 | Phillips et al. | |
| 6,669,490 B1 * | 12/2003 | DelPrete et al. .............. | 439/86 |
| 6,790,057 B1 * | 9/2004 | DelPrete et al. .............. | 439/91 |
| 6,796,810 B1 * | 9/2004 | DelPrete et al. .............. | 439/86 |
| 6,854,985 B1 * | 2/2005 | Weiss ........................... | 439/91 |
| 6,854,986 B1 * | 2/2005 | Weiss ........................... | 439/91 |
| 6,908,318 B1 * | 6/2005 | Kawate ........................ | 439/91 |
| 2001/0016436 A1 * | 8/2001 | Wimmer ....................... | 439/66 |
| 2002/0111055 A1 * | 8/2002 | Matsumura et al. .......... | 439/91 |
| 2003/0228774 A1 * | 12/2003 | Zaderej ........................ | 439/71 |
| 2004/0110400 A1 * | 6/2004 | DelPrete et al. .............. | 439/86 |
| 2004/0110401 A1 * | 6/2004 | DelPrete et al. .............. | 439/91 |
| 2004/0203268 A1 * | 10/2004 | Nishizawa .................... | 439/91 |
| 2005/0009386 A1 * | 1/2005 | Weiss et al. .................. | 439/91 |
| 2005/0215086 A1 * | 9/2005 | Sato et al. .................... | 439/71 |
| 2005/0233620 A1 * | 10/2005 | Hasegawa ..................... | 439/91 |
| 2005/0236179 A1 * | 10/2005 | Hashimoto et al. ......... | 174/256 |
| 2005/0272282 A1 * | 12/2005 | Setata et al. .................. | 439/86 |
| 2005/0275088 A1 * | 12/2005 | Sakurai et al. ............. | 257/723 |

OTHER PUBLICATIONS

Jeff Tyson and Ed Grabianowski, How PCI Works, www.computer.howstuffworks.com, visited May 16, 2005, 9 pages.
Jim Brewer and Joe Sekel, PCI Express Techonology, DELL, Feb. 2004, 11 pages.

(Continued)

Primary Examiner—Ross Gushi
(74) Attorney, Agent, or Firm—Moore & Van Allen PLLC; Matthew W. Witsil

(57) ABSTRACT

An interface module connector for an interface module card to be used in an electronic device. The interface module connector includes a sheet having raised areas that correspond to the position of the electrical contacts of the interface module card. An electrically conductive compliant material extends through the raised areas, providing electrical contacts for the connector. The connector electrical contacts may be electrically connected to a PCB. The connector may be for a SIM card. A PCB assembly may be provided, including a connector mounted to a PCB, with a shield mounted to the PCB and substantially enclosing the connector. The shield may define a slot to receive an interface module. In one embodiment the PCB may be a PCI Mini Express Card, and in another embodiment the slot adapted to receive the interface module may have a height of approximately 1.35 mm or less.

11 Claims, 5 Drawing Sheets

OTHER PUBLICATIONS

INTEL, The Emergence of PCI Express in the Next Generation of Mobile Technology, www.intel.com, visited May 16, 2005, 5 pages.

PCI—SIG, PCI Express Architecture Frequently Asked Questions, www.pcisig.com. visited May 16, 2005, 3 pages.

Jim Brewer and Joe Sekel, The Techzone, PCI Express Mini Card, www.thetechzone.com, visited May 16, 2005, 3 pages.

ZOFLEX, ZOFLEX ZL45.1 Pressure-Activated Conductive Rubber, www.zoflex.com, 2003.

PCMCIA, www.webopedia.com, visited May 16, 2005, 3 pages.

* cited by examiner

US 7,052,290 B1

LOW PROFILE CONNECTOR FOR ELECTRONIC INTERFACE MODULES

BACKGROUND

Many electronic devices include modules or plug-ins that perform a variety of functions. Such devices may be portable and may include, but are not limited to, laptop computers, cellular telephones, personal digital assistants (PDAs), calculators, and handheld games or controllers, or any device in which a removable memory, memory and processor combined, digital signal processor, or power source card is desired. Such devices commonly incorporate the use of a Subscriber Identity Module (SIM) card having standard SIM reader electrical contacts. A connector typically receives a SIM card with contacts corresponding to the standard SIM card contacts.

An example of where a SIM card may be used is with a Peripheral Component Interconnect (PCI) bus, found in computers. A PCI Card provides direct access to system memory for devices connected to the card. A bridge is used to connect to the frontside bus, which connects to the CPU. Because there is an ongoing effort to reduce overall device size, PCI Cards are largely being replaced by cards having smaller sizes as well as advanced features. As the size of electronic devices decreases, the reduction of the size of various components within each device becomes valuable and desirable in order to decrease the overall device size. Mini PCI Cards are small internal cards functionally equivalent to PCI Cards. PCI Express Cards are an improvement over PCI Cards, whereby a point-to-point switching connection is provided. Two devices on the bus are directly connected when communicating with each other, allowing devices to communicate without slowing each other down. A yet further improvement is the PCI Express Mini Card, currently used in, among other places, laptop computers. This card replaces the Mini PCI Card and is approximately one half of the form factor of a Mini PCI Card, allowing a reduction in size or use of two PCI Mini Express Cards in the same space.

SIM card and their connectors may also be used in, for example, mobile telecommunications devices, laptop computers, the Personal Computer Memory Card International Association (PCMCIA) Card, and the PCMCIA Express Card. Examples of the various mobile telecommunication devices in which SIM cards may be desired include devices operating on the Groupe Special Mobile (also known as GSM or Global System for Mobile Communications) standard digital cellular phone service. The SIM connector may be integral to the mobile telecommunication device, and is often accessible beneath the battery. The SIM card may be installed or inserted into the SIM connector of the mobile telecommunication device, linking that mobile telecommunication device to the subscriber-related information stored on the SIM card. The subscriber-related information facilitates a telephone call from any valid mobile communication device, because the subscriber-related information is used to complete the call rather than specific internal physical identifiers (such as an internal serial number) that may be associated with the mobile telecommunication device.

In general, the form factors of conventional SIMs are substantially planar, and in some cases SIMs may be about the size of a postage stamp. SIM connectors have approximately the same form factor, and may also be approximately the same thickness; for PCI Mini Express Cards, a standard height available to accommodate both a SIM and a SIM connector is approximately 1.35 mm. A conventional SIM and SIM connector, which are stacked, exceed this height, and accordingly the combined height limits the use of SIMs with such reduced size cards. This in turn may limit a desired reduction in size of the device in which SIM cards are disposed.

SUMMARY OF THE INVENTION

In accordance with an embodiment of the present invention, an interface module connector for an interface module card to be used in an electronic device is provided. The card includes a body having a major surface, at least one component selected from the group including memory, a processor, and a power source, and electrical contacts on the major surface. The interface module connector includes a sheet having first and second sides, including raised areas extending from the first side of the sheet that correspond to the position of the electrical contacts of the interface module card. An electrically conductive compliant material extends from the second side of the sheet through the raised areas of the sheet and is adapted to contact the electrical contacts of the interface module card. An electrically conductive material on the second side of the sheet extends from the electrically conductive compliant material along the second side of the sheet, and is adapted to form at least part of an electrical circuit with a printed circuit board.

In accordance with another embodiment of the present invention, a connector for a SIM card including electrical contacts is provided. The connector includes a sheet having first and second sides, including raised areas extending from the first side of the sheet that correspond to the position of the electrical contacts of the SIM card. An electrically conductive rubber extends from the second side of the sheet through the raised areas of the sheet and is adapted to contact the electrical contacts of the SIM card. An electrically conductive material on the second side of the sheet extends from the electrically conductive rubber along the second side of the sheet, and is adapted to form at least part of an electrical circuit with a printed circuit board.

In accordance with another embodiment of the present invention, a printed circuit board (PCB) assembly is provided. The PCB assembly includes a PCB having a contact side and a printed circuit side. A sheet includes first and second sides, with the second side mounted to the contact side of the PCB, including raised areas extending from the first side and away from the PCB. An electrically conductive compliant material extends through the raised areas of the sheet and is adapted to contact the electrical contacts of the interface module card. An electrically conductive material on the second side of the sheet extends from the electrically conductive compliant material along the surface of the second side, and is adapted to form at least part of an electrical circuit with the PCB. A shield is provided that includes a housing mounted to the contact side of the PCB and substantially encloses the sheet, defining a slot adapted to receive an interface module. In one embodiment the PCB may be a PCI Mini Express Card, and in another embodiment the slot adapted to receive the interface module may have a height of approximately 1.35 mm or less.

In accordance with another embodiment of the present invention, a method of making an interface module connector is provided. The method includes selecting a sheet material having a first side and a second side. The sheet is deformed to make raised areas extending from the first side of the sheet where electrical contacts are desired. An opening is made at the center of each raised area. The raised areas are filled with electrically conductive compliant material, such that the electrically conductive compliant material extends through the opening to form a contact point adapted to electrically connect with an interface module card. Electrically conductive material is applied to at least part of one circuit on the second side of the sheet, extending from the electrically conductive compliant material and adapted to electrically connect to contacts on a printed circuit board.

Features and advantages of the present invention will become more apparent in light of the following detailed description of some embodiments thereof, as illustrated in the accompanying figures. As will be realized, the invention is capable of modifications in various respects, all without departing from the invention. Accordingly, the drawings and the description are to be regarded as illustrative in nature, and not as restrictive.

DETAILED DESCRIPTION OF THE INVENTION

Certain terminology is used herein for convenience only and is not to be taken as a limitation on the invention. For example, words such as "top," "bottom," "upper," "lower," "horizontal," "vertical," "inward," "outward," "upward," and "downward" merely describe the configuration shown in the figures. It is understood that the components may be oriented in any direction and the terminology, therefore, should be understood as encompassing such variations unless specified otherwise.

As used herein, the term "mobile terminal" may include, among other things: a conventional laptop computer and/or palmtop receiver or other appliance; a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; a calculator; a handheld game or controller; and a personal music playback system such as for CDs, minidisks, MP-3 files, memory sticks, or the like. Conventional interface modules for such devices are, in general, substantially planar.

Figure 1:
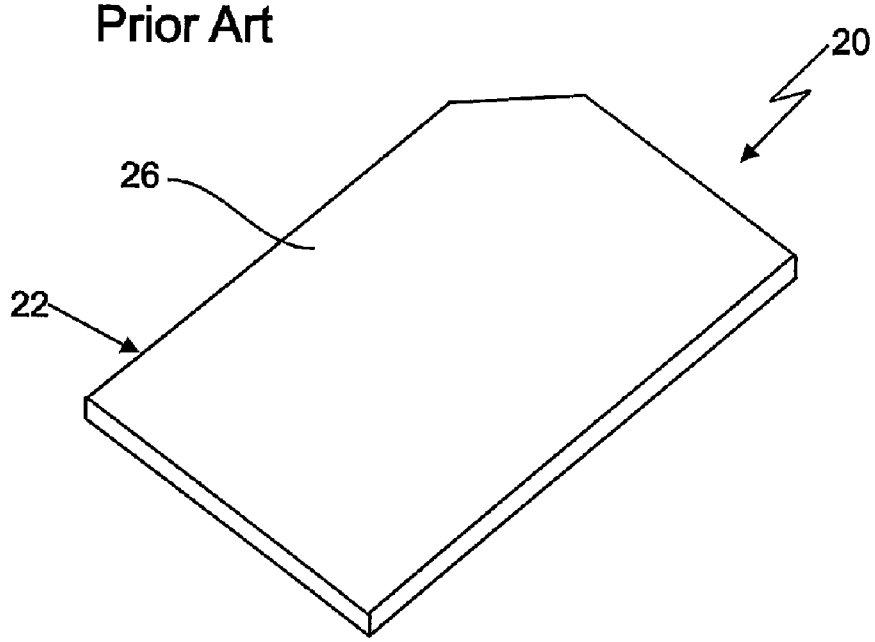
FIG. 1 is a top perspective view a prior art SIM card.
Figure 2:
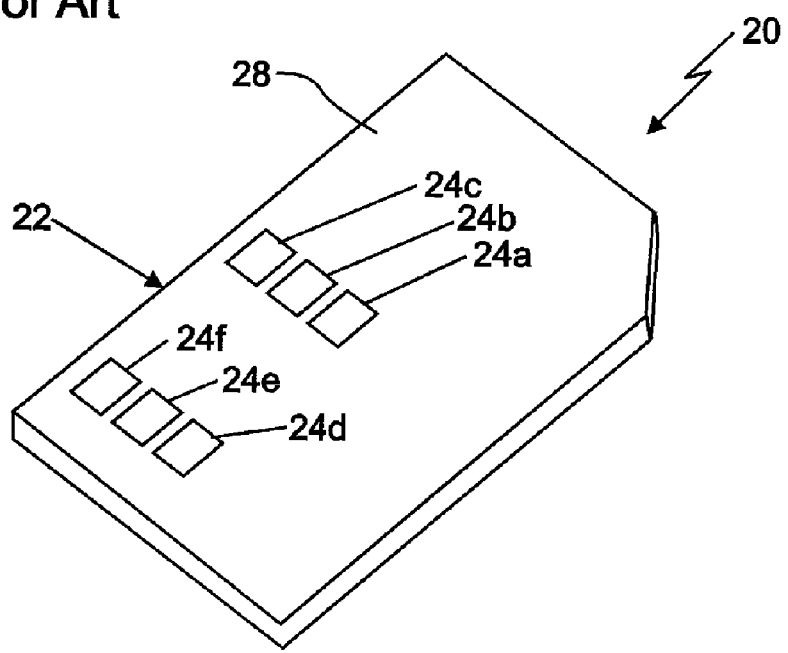
FIG. 2 is a bottom perspective view of the prior art SIM card of FIG. 1.

Referring now to the drawings, FIGS. 1 and 2 show an interface module 20, which in this case is a conventional SIM card that may be used in the variety of mobile terminals discussed above or personal computers. Many other types of interface modules exist, and it should be understood that a SIM card 20 is but one type, to which the present invention is not limited. It should be understood that the SIM card 20 could be any one of a variety of devices that include, for example, memory, a processor, or a power source, or other device providing functionality as desired. The invention is not limited by the type of device; rather, the use of SIM cards, for the purpose of discussion, is merely one embodiment of the invention.

The SIM card 20 may have a body 22 and six SIM card electrical contacts 24a–24f, although it will be recognized that any number of SIM card data contacts would fall within the scope of the invention. The SIM card 20 is substantially flat, or substantially planar, and has a first major surface 26 on its top that is substantially parallel to and opposite from a second major surface 28 on its bottom. A major surface is the surface on the part having the greatest area.

Figure 3:
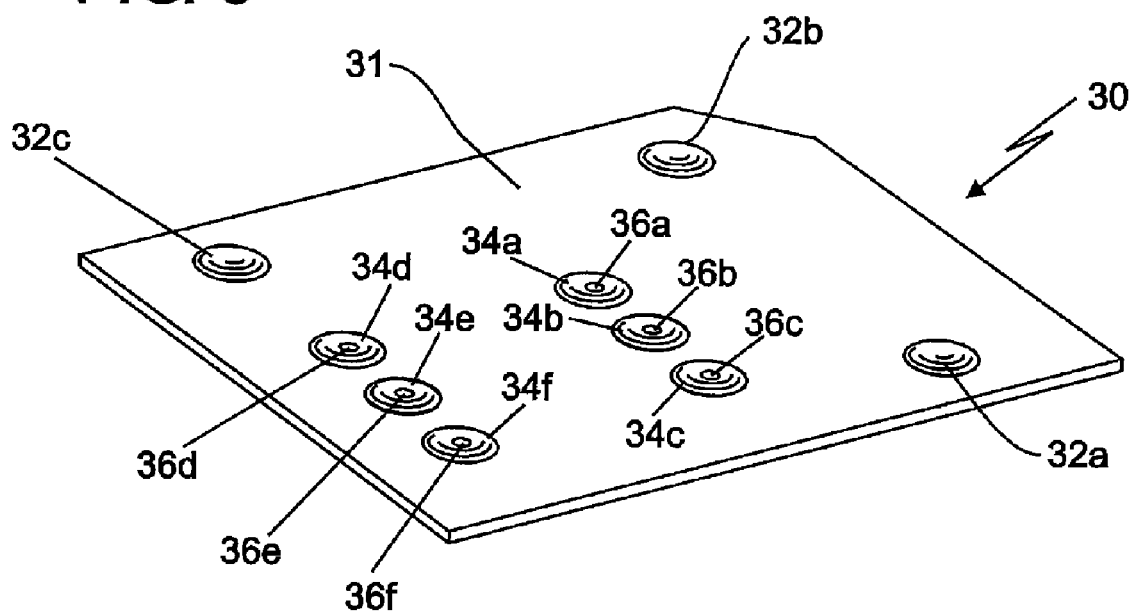
FIG. 3 is a top perspective view of an embodiment of a low profile connector according to the present invention.

FIG. 3 shows an embodiment of a low profile interface module connector 30 in accordance with the present invention. The connector is formed from a sheet 31 made of, for example, a polyimide or polyester, but may be made of any material selected by one of ordinary skill in the art. Raised areas, resembling domes in this embodiment of the connector, are provided. Three of the domes 32a, 32b, 32c serve as supports for an interface module, or in this embodiment, a SIM card 20. The remaining six domes 34a–34f include electrical contacts 36a–36f.

Figure 4:
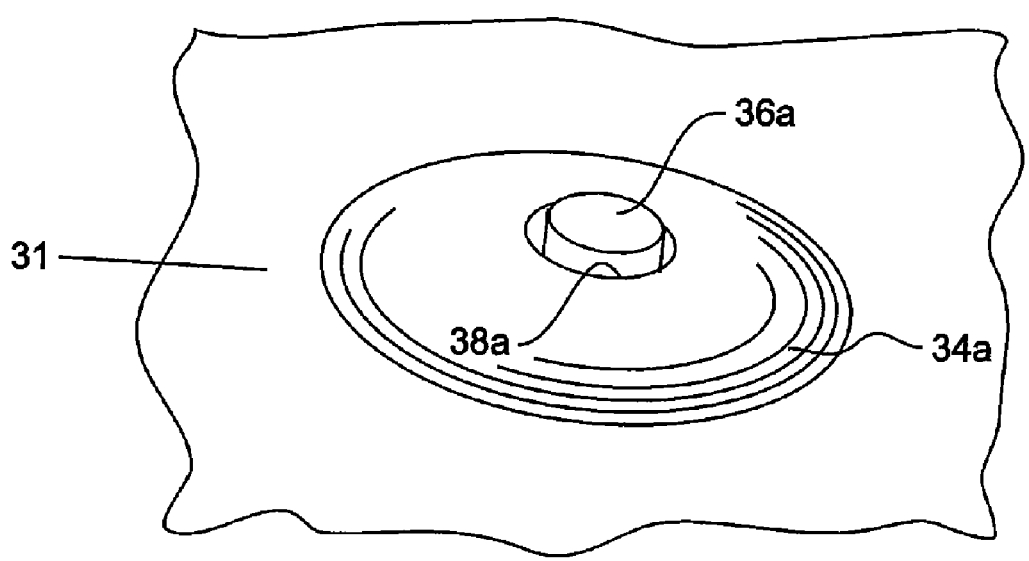
FIG. 4 is an enlarged detail view of a portion of the low profile connector of FIG. 3.

The six contact domes 34a–34f are in registration with the contacts 24a–24f on the SIM card 20. FIG. 4 shows a contact dome 34a and corresponding electrical contact 36a. The connector contact 36a protrudes through the dome 34a in an aperture 38a in the sheet; this configuration is similar for the other contact domes 34b–34f as well. The contacts 36a–36f may be made of electrically conductive resilient material, such as electrically conductive rubber. Such material allows positive pressure on the SIM card contacts 24a–24f to provide a constant connection, keeping the connector contacts 36a–36f and the SIM card contacts 24a–24f in close and complementary registration.

Figure 5:
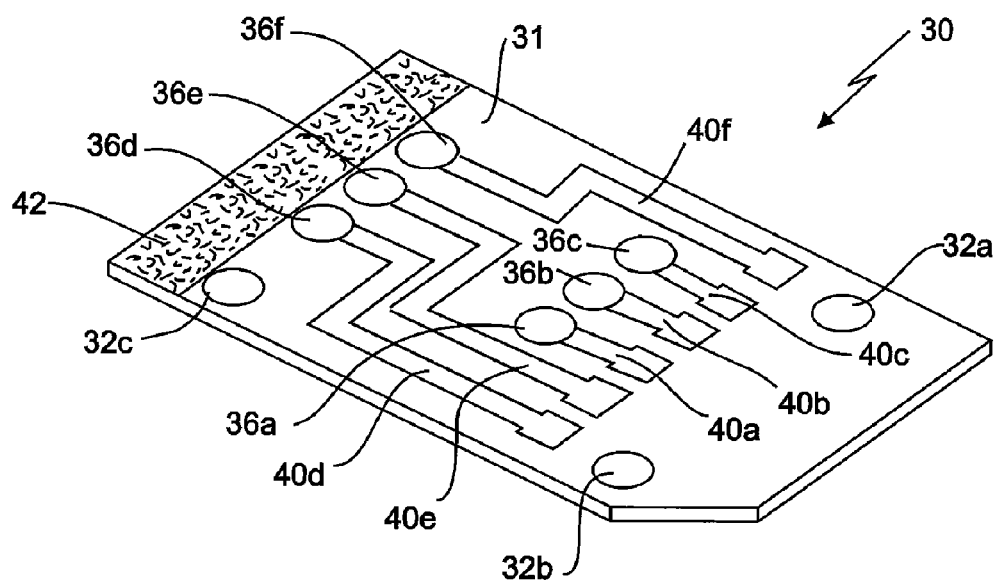
FIG. 5 is a bottom perspective view of a portion of the low profile connector of FIG. 3.

As shown in FIG. 5 on the bottom side of the connector 30, the electrically conductive rubber may be placed to fill substantially the void inside each electrical contact dome 34a–34f and form the connector electrical contacts 36a–36f. Electrical leads 40a–40f are deposited on the bottom side of the connector 30, and in the case of the embodiment shown, may lead to and connect to a "hot bar" that in turn connects to the circuitry of a PCB. Adhesive 42 may be provided at one end of the connector 30 for attaching to the PCB.

Figure 6:
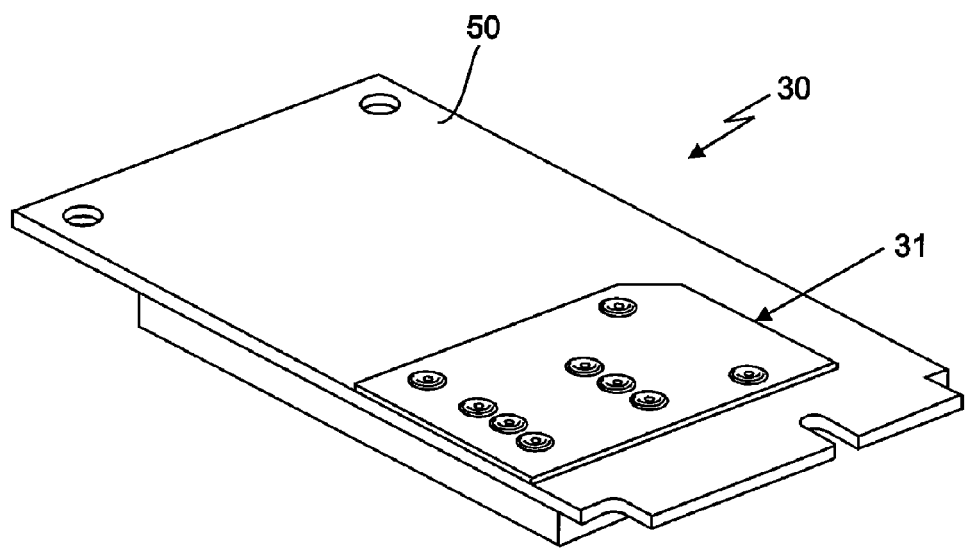
FIG. 6 is a top perspective view of a PCB with the low profile connector of FIG. 3 mounted to it.
Figure 7:
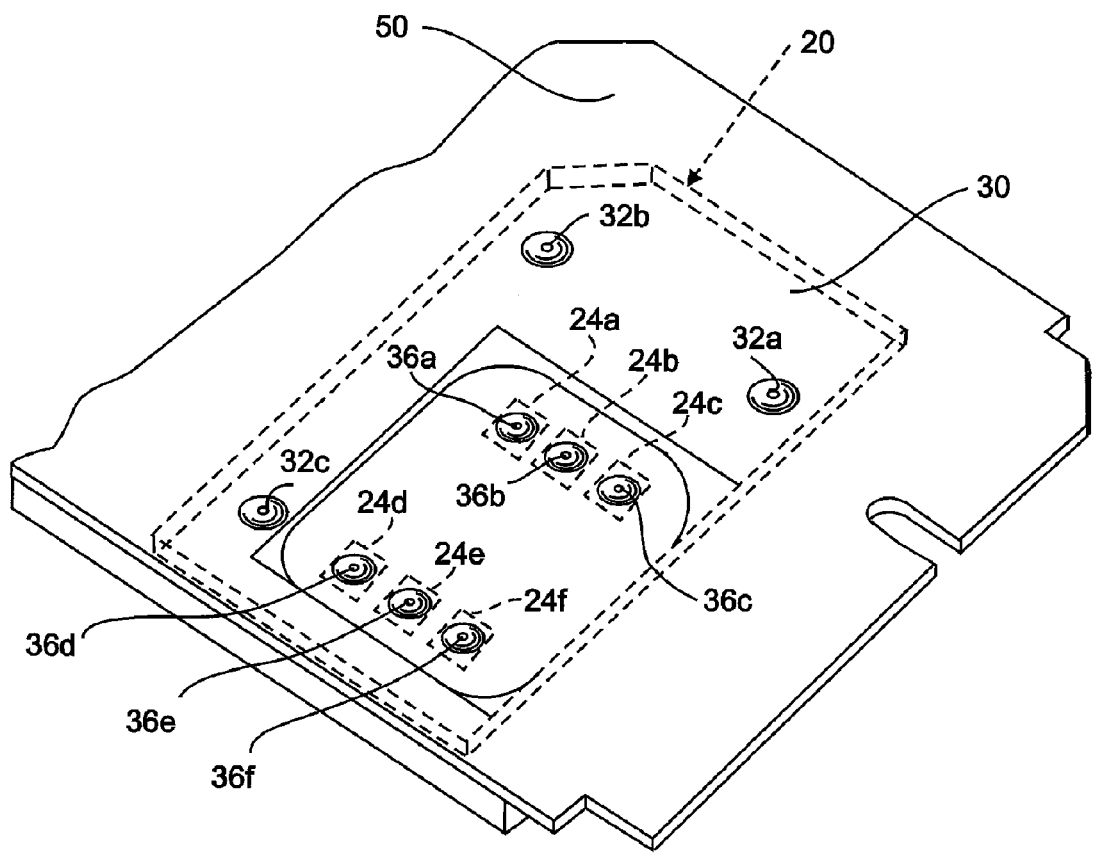
FIG. 7 is a top perspective view of a PCB with the low profile connector of FIG. 3 mounted to it, with the SIM card of FIG. 1 shown in phantom line and mounted to the connector.

FIG. 6 shows a connector 30 mounted to a PCB 50. In FIG. 7 a SIM card 20 is shown in phantom line in position directly above the connector 30. The SIM card contacts 24a–24f and connector contacts 36a–36f are in close and complementary registration. The support domes 32a–32c are located along the periphery of the SIM card 20.

Figure 8:
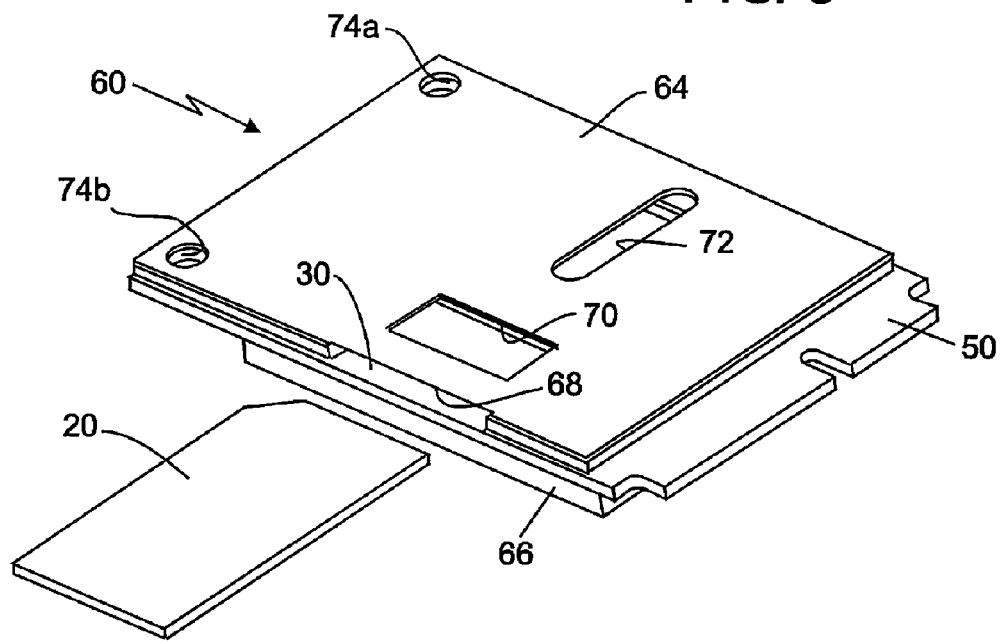
FIG. 8 is a top perspective view of an assembled PCB, top cover, and bottom cover, and low profile connector of FIG. 3, and the SIM card of FIG. 1.
Figure 9:
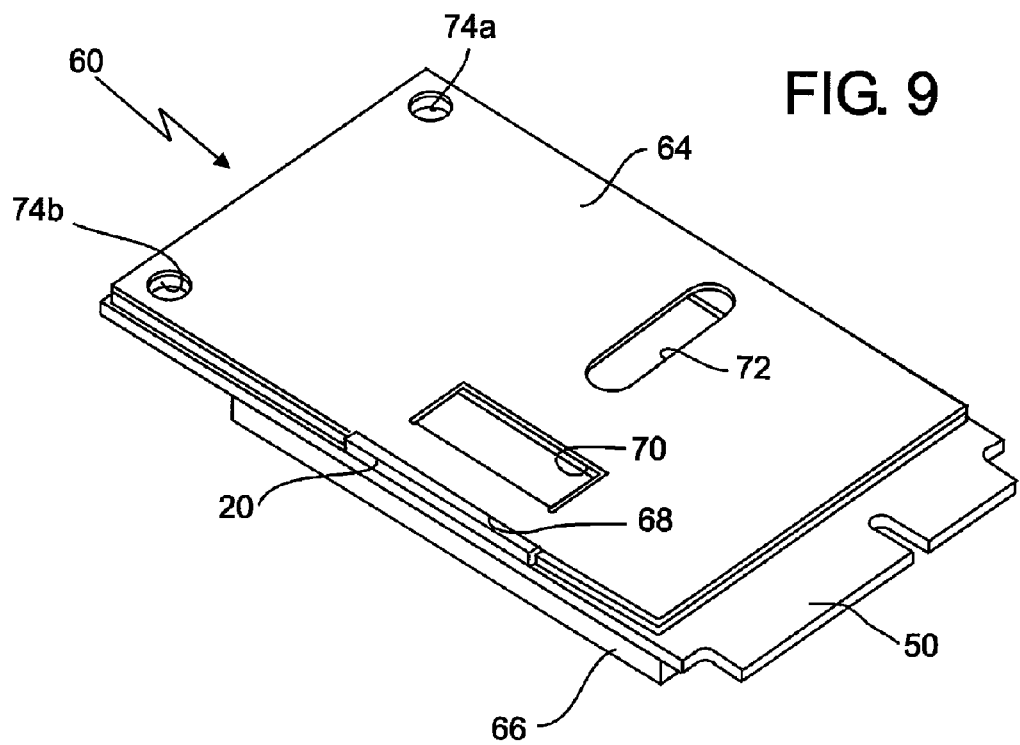
FIG. 9 is a top perspective view of the assembled PCB, top cover, and bottom cover of FIG. 8 with the SIM of FIG. 1 inserted into the assembly.

FIGS. 8 and 9 show an assembled PCI Mini Express Card 60. The PCI Mini Express Card 60 includes a PCB 50, a top cover 64, and a bottom cover 66. A connector 30 (not visible in FIG. 9) is mounted to the PCB 50. A SIM card 20 is aligned in front of a SIM card slot 68 defined by the PCB 50 and the top cover 64. A window 70 allows viewing through the top cover 64. A narrow slot 72 in the top cover 64 is provided for a nail or other tool to be used to expel the SIM card 20 from the SIM slot 68. Holes 74a, 74b are provided in PCI Mini Express Card 60 for fastening to the host device.

To produce one embodiment of a connector 30 in accordance with the present invention, the sheet 31 base material, which as previously discussed may be polyimide, polyester, or other material as selected by one of ordinary skill in the art, will be raw stock provided in rolls. The electrical leads 40a–40f, which may be, for example, copper traces or other electrically conductive material, would first be created as with a standard flex circuit. This sheet 31 would then have holes 38a and domes 34a–34f or cupped pockets created with conventional metal punch and dies, creating an array that makes up the finished part. Next the conductive rubber 36a–36f will be squeegeed into the domes 34a–34f or pockets and dried. The individual connectors 30 are then cut from the roll using a cutting die.

One of ordinary skill in the electrical device arts will quickly recognize that the invention has other applications in other environments. It will also be understood by someone of ordinary skill in the art that the functionality of the interface modules may vary widely. In fact, many embodiments and implementations are possible. For example, the cards may function as storage devices for identification information, security information, financial information, and programs, all without departing from the scope of the present invention. A connector could be made or formed to a shape other than planar. The following claims are in no way intended to limit the scope of the invention to the specific embodiments described. It should be understood by those skilled in the art that the foregoing modifications as well as various other changes, omissions and additions may be made without parting from the spirit and scope of the present invention.

What is claimed is:

1. An interface module connector for an interface module card to be used in an electronic device, the interface module card including a body having a major surface and electrical contacts on the major surface, the interface module connector comprising:
   a sheet having first and second sides, including raised areas extending from the first side of the sheet, with such areas corresponding to the position of the electrical contacts of the interface module card;
   electrically conductive compliant material extending from the second side of the sheet through the raised areas of the sheet and adapted to contact the electrical contacts of the interface module card; and
   electrically conductive material on the second side of the sheet extending from the electrically conductive compliant material along the second side of the sheet, adapted to form at least part of an electrical circuit with a printed circuit board.

2. The interface module connector of claim 1, wherein the sheet is made of material selected from the group including a polyimide and polyester.

3. The interface module connector of claim 1, wherein the interface module is a subscriber identity module.

4. The interface module connector of claim 1, wherein the electrically conductive compliant material is electrically conductive rubber.

5. A connector for a subscriber identity module (SIM) card including electrical contacts, the connector comprising:
   a sheet having first and second sides, including raised areas extending from the first side of the sheet, with such areas corresponding to the position of the electrical contacts of the SIM card;
   electrically conductive rubber extending from the second side of the sheet through the raised areas of the sheet and adapted to contact the electrical contacts of the SIM card; and
   electrically conductive material on the second side of the sheet extending from the electrically conductive rubber along the second side of the sheet, adapted to form at least part of an electrical circuit with a printed circuit board.

6. A printed circuit board (PCB) assembly comprising:
   a PCB having a contact side and a printed circuit side;
   a sheet having first and second sides, the second side mounted to the contact side of the PCB, including raised areas extending from the first side and away from the PCB;
   electrically conductive compliant material extending through the raised areas of the sheet and adapted to contact the electrical contacts of the interface module card; and
   electrically conductive material on the second side of the sheet, extending from the electrically conductive compliant material along the surface of the second side, adapted to form at least part of an electrical circuit with the PCB; and
   a shield including a housing mounted to the contact side of the PCB and substantially enclosing the sheet, defining a slot adapted to receive an interface module.

7. The PCB assembly of claim 6, further comprising an interface module including a subscriber identity module (SIM) card.

8. The PCB assembly of claim 7, wherein the sheet and the SIM card are received in the slot.

9. The PCB assembly of claim 8, wherein the PCB is a PCI Mini Express Card.

10. The PCB assembly of claim 9, wherein the slot defined by the shield has a height of approximately 1.35 mm or less.

11. A method of making an interface module connector, comprising:
    selecting a sheet material having a first side and a second side;
    applying electrically conductive material to at least part of one circuit on the second side of the sheet, extending from the electrically conductive compliant material and adapted to electrically connect to contacts on a printed circuit board;
    deforming the sheet to make raised areas extending from the first side of the sheet where electrical contacts are desired;
    making an opening at the center of each raised area; and
    substantially filling the raised areas with electrically conductive compliant material, such that the electrically conductive compliant material extends through the opening to form a contact point adapted to electrically connect with an interface module card.

* * * * *